(12) United States Patent
Takahashi et al.

(10) Patent No.: US 6,397,896 B2
(45) Date of Patent: Jun. 4, 2002

(54) HEAT AND CORROSION RESISTANT STEEL PIPE HAVING MULTI-LAYERED COATING

(75) Inventors: Teruhisa Takahashi; Seiya Takahata, both of Mishima; Masayoshi Usui, Numazu, all of (JP)

(73) Assignee: Usui Kokusai Sangyo Kaisha Ltd., Shizuoka (JP)

( * ) Notice: Subject to any disclaimer, the term of this patent is extended or adjusted under 35 U.S.C. 154(b) by 0 days.

(21) Appl. No.: 09/847,316

(22) Filed: May 3, 2001

Related U.S. Application Data

(63) Continuation of application No. 08/966,854, filed on Nov. 10, 1997, now abandoned, which is a continuation of application No. 08/792,118, filed on Jan. 31, 1997, now abandoned, which is a continuation of application No. 08/638,878, filed on Apr. 25, 1996, now abandoned, which is a continuation of application No. 08/145,730, filed on Nov. 4, 1993, now abandoned, which is a continuation of application No. 08/004,198, filed on Jan. 13, 1993, now abandoned, which is a continuation of application No. 07/849,810, filed on Mar. 11, 1992, now abandoned, which is a continuation of application No. 07/729,855, filed on Jul. 12, 1991, now abandoned, which is a continuation of application No. 07/408,000, filed on Sep. 15, 1989, now abandoned.

(30) Foreign Application Priority Data

Sep. 17, 1988 (JP) .......................................... 63-233152
Oct. 29, 1988 (JP) .......................................... 63-274217

(51) Int. Cl.$^7$ .................................................. F16L 9/14
(52) U.S. Cl. ...................... 138/146; 138/143; 138/137; 138/141; 428/623
(58) Field of Search ................................ 138/146, 143, 138/142, 145, 156, 171, DIG. 1, DIG. 6, DIG. 7; 428/623, 626, 632

(56) References Cited

U.S. PATENT DOCUMENTS

| | | | |
|---|---|---|---|
| 4,287,034 A | 9/1981 | Pieslak et al. | 138/DIG. 1 |
| 4,500,610 A | 2/1985 | Gunn et al. | 428/624 |
| 4,659,394 A | 4/1987 | Hara et al. | 428/623 |
| 4,775,600 A | 10/1988 | Adaniya et al. | 428/623 |
| 4,849,301 A | 7/1989 | Kanasashi | 428/623 |
| 4,853,297 A | 8/1989 | Takahashi et al. | 138/143 |

*Primary Examiner*—Patrick Brinson
(74) *Attorney, Agent, or Firm*—Rader, Fishman & Grauer, PLLC

(57) ABSTRACT

A heat and corrosion resistant steel pipe having multi-layered coating comprising a steel pipe, a Zn—Ni alloy plating layer deposited to the outer surface of the steel pipe and a polyvinyl fluoride layer formed on the Zn—Ni alloy plating layer with an epoxy resin therebetween as an intermediate layer. A metal plating layer comprising Zn—Ni plating layer and Ni-plating layer may be used instead of the Zn—Ni plating layer. A chromate layer may be formed on the metal plating layer.

12 Claims, 2 Drawing Sheets

HEAT AND CORROSION RESISTANT STEEL PIPE HAVING MULTI-LAYERED COATING

This is a continuation of application Ser. No. 08/966,854 filed Nov. 10, 1997, now abandoned, which is a continuation of application Ser. No. 08/792,118 filed Jan. 31, 1997, now abandoned, which is a continuation of application Ser. No. 08/638,878, filed Apr. 25, 1996, now abandoned, which is a continuation of application Ser. No. 08/145,730, filed Nov. 4, 1993, now abandoned, which is a continuation of application Ser. No. 08/004,198, filed Jan. 13, 1993, now abandoned, which is a continuation of application Ser. No. 07/849,810, filed Mar. 11, 1992, now abandoned, which is a continuation of application Ser. No. 07/729,855, filed Jul. 12, 1991, now abandoned, which is a continuation of application Ser. No. 07/408,000, filed Sep. 15, 1989, now abandoned. The disclosure of the prior applications is hereby incorporated by reference herein in its entirety.

BACKGROUND OF THE INVENTION

1. Field of the Invention

The present invention concerns a pipe of relatively small outer diameter such as less than about 20 mm disposed as a fluid transportation pathway to automobiles or like outer various machineries and, more in particular, it relates to a heat and corrosion resistant steel pipe having multi-layered coating with a protection layer capable of withstanding severe corrosive circumstance.

2. Description of the Prior Art

As pipeways used for automobiles or other machineries, those products having Zn-plating layer formed to the outer surface of a steel pipe and applied with chromate treatment to the Zn-plating layer have generally been used.

However, working conditions are severe, for example, in braking or fuel pipeways of automobiles and there have been demands for heat resistance under high temperature circumstance such as at the periphery of engines, resistance to external mechanical forces such as scratch resistance and impact shock resistance in underfloor pipeways that easily suffer from external injuries as well as higher corrosion resistance. For coping with such demands, those having a further plastic protection coating formed on the Zn-plating layer have also been used and Japanese Patent Publication Nos. Sho 57-60434 and Sho 61-23271 propose a method of applying a Zn-plating by means of electrolytic process to the surface of a metal object, forming a relatively thick special chromate layer to the Zn layer by using a chromic acid solution containing formic acid and then forming a fluoro resin layer on the chromate layer.

However, in the protection layer formed by the above-mentioned method, it is necessary to increase the Zn-plating layer as greater than 25 um in order to improve the corrosion resistance of the metal plating layer, which brings about a problem that the productivity is remarkably worsened Further, for attaining a tight bonding with the fluoro resin, it is necessary to form the chromate layer by using a chromic acid solution at relatively high concentration containing formic acid, which results in a problem that a lot of chemicals for the treating solution is consumed and the processing cost is increased for the solution wastes containing noxious hexavalent chromium.

SUMMARY OF THE INVENTION

The object of the present invention is to overcome the foregoing problems and to obtain a heat and corrosion resistant steel pipe having multi-layered coating which is durable under severe corrosive circumstance including external mechanical forces by improving the heat and corrosion resistance of a metal plating layer in a corrosion resistant protection layer comprising a metal plating layer and a resin layer laminated to each other and applied to the surface of the steel pipe and forming a resin layer with a tight adherance to the metal plating layer.

The present inventors have made an earnest study for overcoming the foregoing problems and attaining the foregoing object and, as a result, have accomplished the present invention based on the finding that the object can be attained by forming a multi-layered coating with an epoxy resin being intervened as an intermediate layer upon forming a fluoro resin layer on a metal plating layer forming the metal plating layer by laminating a Ni-plating layer of a specific thickness and a Zn—Ni alloy plating layer. That is, the first embodiment of the present invention is a heat and corrosion resistant steel pipe having multi-layered coating comprising a steel pipe, a Zn—Ni alloy plating layer deposited to the outer surface of the steel pipe and a polyvinyl fluoride layer formed on the Zn—Ni alloy plating layer with an epoxy resin being intervened as an intermediate layer.

The second embodiment of the present invention is a heat and corrosion resistant steel pipe having multi-layered coating comprising a steel pipe, a Zn—Ni alloy plating layer deposited on the outer surface of the steel pipe, a chromate layer formed on the Zn—Ni alloy plating layer and a polyvinyl fluoride layer formed on the chromate layer with an epoxy resin being intervened as an intermediate layer.

Further, in the third embodiment of the present invention, a Ni-plating layer of 0.2–10 um thickness is present between the outer surface of a steel pipe and a Zn—Ni alloy plating layer and a chromate layer is formed on the Zn—Ni alloy plating layer with the Ni-plating layer being intervened.

DETAILED DESCRIPTION OF THE INVENTION

Figure 1:
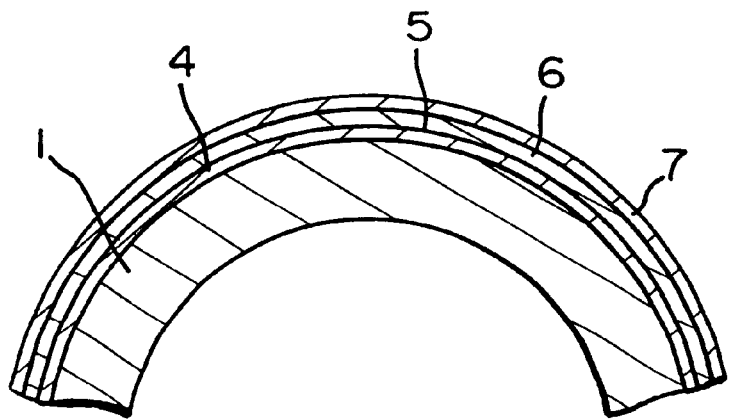
FIG. 1 is an enlarged cross sectional view, taken along the diametrical direction, for a portion of one embodiment of a heat and corrosion resistant steel pipe having multi-layered coating according to the present invention.
Figure 2:
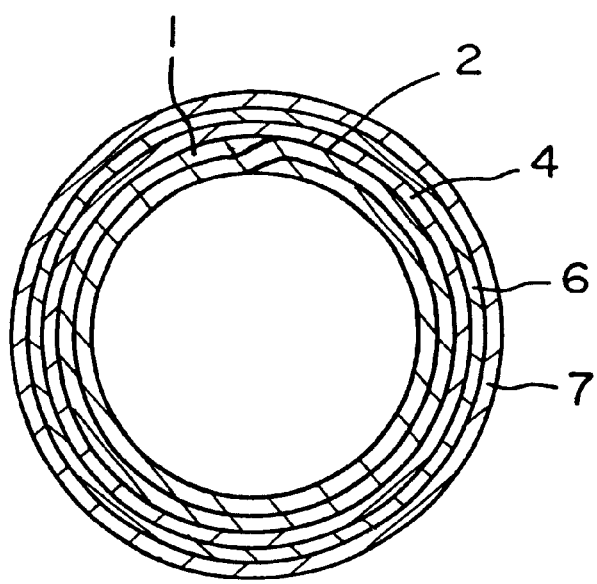
FIG. 2–FIG. 4 are, respectively, enlarged cross sectional views, taken along the diametrical direction of another embodiment of the present invention.

At first, a steel pipe 1 in FIG. 1 and FIG. 2 is made, for example, of STPG, which is an electric welded tube having outer diameter of less than 20 mm and wall thickness of 0.5–1 mm (FIG. 1) or a double-wound pipe formed by double-winding a hoop sheet and brazing the mating surfaces by means of a Cu-plating layer previously applied to the surface thereof and forming a Cu plating layer 2 of about 3 um thickness also to the outer circumferential surface thereof (FIG. 2). A Zn—Ni alloy plating layer 4 is formed to the outer circumferential surface of the steel pipe, for example, by electric plating using a known chloride bath or sulfate bath. The Ni content is preferably from 2 to 20%, although depending on the composition of the plating bath and the current density, and the layer thickness is about less than 15 um in view of the corrosion resistance, easy formation of the chromate layer described later, post-fabricability such as bending fabrication, etc. Ni content is, more preferably, from 12 to 15% in view of the corrosion resistance. A chromate layer 5 is formed on the Zn—Ni alloy plating layer 4 by using a chromic acid at low concentration, a processing solution prepared by adding sulfuric acid to dichromic acid, or commercially available chromate processing solution for Zn—Ni plating, which can effectively improve the corrosion resistance. However, a resin layer forming the intermediate layer described later may be formed directly to the Zn—Ni alloy plating layer without forming the chromate layer. An epoxy resin intermediate layer 6 is directly deposited on the chromate layer 5 (FIG. 1) or on the Zn—Ni alloy plating layer 4 (FIG. 2), and it is formed to a thickness of about 3 to 10 um by coating by means of dipping or spraying using a primer basically composed of an epoxy resin and then applying heat-drying. The intermediate layer 6 is put between the underlying Zn—Ni alloy plating layer 4 or the chromate layer 3 formed thereover and the uppermost polyvinyl fluoride layer to thereby firmly bonding both of the layers. A polyvinyl fluoride layer 7 is formed by using a solution in which polyvinyl fluoride is dispersed in a high boiling solvent, for example, dimethyl or diethyl phthalate such that the solid of the resin is no more recognized, coating by means of dipping or spraying and then setting to a thickness of about 10–25 um by heat drying upto about 350° C.

Figure 3:
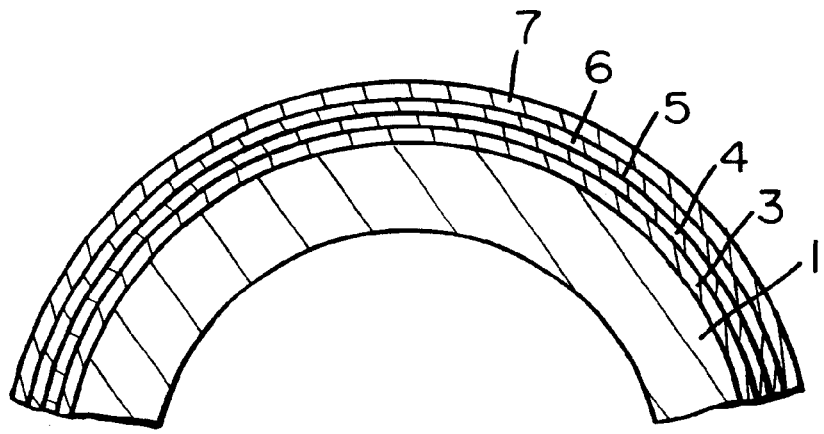
Figure 4:
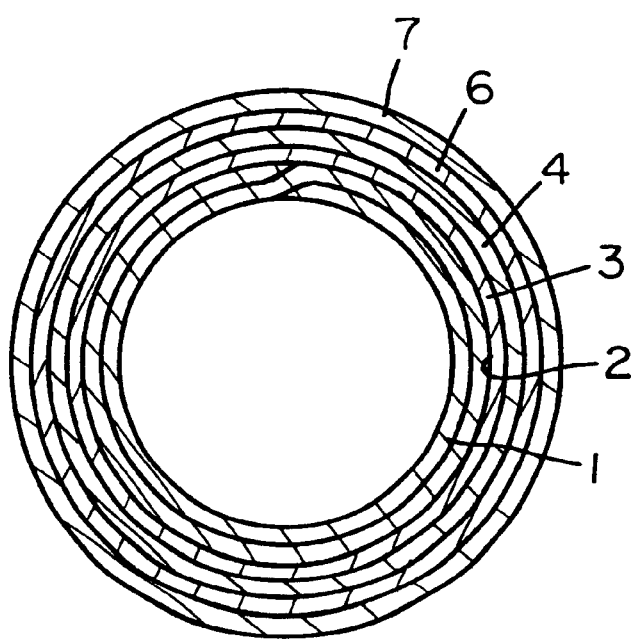

Then, FIG. 3, FIG. 4 shows other embodiments, in which FIG. 3 is an electro-welded tube similar to that in FIG. 1 and FIG. 4 shows a double-wound pipe similar to that in FIG. 2, with identical portions being shown by identical reference numerals.

In the embodiments shown in FIG. 3 and FIG. 4, a Ni-plating layer 3 is intervened between the outer surface of the steel pipe 1 and the Zn—Ni alloy plating layer, in addition to the constituents in the embodiments shown in FIG. 1 and FIG. 2.

That is, the Ni-plating layer 3 is deposited as a lower layer to the outer surface of the steel pipe 1 and formed by electro-deposition using a Watt bath generally known as an electric plating bath. The layer thickness is preferably within a range from 0.2 to 10 um. If the layer thickness is less than 0.2 um, the coating performance to the iron and steel substrate is poor and no substantial improvement can be obtained for the corrosion resistance. On the contrary, if the layer thickness exceeds 10 um, peeling, cracking, etc. may possibly be caused upon applying subsequent fabrication such as pressing or bending, to rather deteriorate the corrosion resistance.

Since the heat and corrosion resistant steel pipe having multi-layered coating according to the present invention has thus been constituted, the Zn—Ni alloy plating layer or the laminated layer of the Ni-plating layer and the Zn—Ni alloy plating layer has more excellent corrosion resistance with a reduced layer thickness and heat and corrosion resistance not deteriorated even under high temperature circumstance as compared with conventional Zn-plating layer. In addition, since the epoxy type resin is used as the intermediate layer, the polyvinyl fluoride resin which is mechanically tough, has high heat resistant temperature and is excellent in weather proofness and chemical resistance can be deposited with tight adherence, scratch resistance and impact shock resistance are excellent and excellent performance as a protection layer can be provided in severe corrosive circumstance.

EXAMPLE

Explanation is to be made for the examples of the present invention.

Example 1

(1) Steel Pipe a
A double-wound steel pipe with having 8 mm outer diameter, 0.7 mm wall thickness and 330 mm length was prepared by using a hoop sheet made of SPCC and having copper plating layer of 3 um thickness on both surfaces.
(2) Formation of Zn—Ni Alloy Plating Layer
An alloy plating layer of 8 um thickness was formed by using a Zn—Ni alloy plating bath comprising a chloride bath (Zn-10MU, manufactured by Ebara-Udylite Co., Ltd.).
(3) Formation of Resin Layer
The steel pipe a formed with the Zn—Ni alloy plating layer obtained in (2) above was immersed in a paint prepared from an epoxy resin and a pigment dissolved in a solvent to apply resin coating and then heat-treated at 350° C. for 60 sec to form an intermediate layer of an epoxy resin of about 5 um thickness. Then, it was immersed in a solution comprising polyvinyl fluoride coating dispersed in diethyl phthalate to apply polyvinyl fluoride and then heat-dried at 250° C. for 60 sec, to form a polyvinyl fluoride layer of about 15 um film thickness.
(4) Heat Resistant and Corrosion Resistant Test
The multi layer coated steel pipe obtained as described above was applied with 180° bending with 25 R at one end into a sticky-like configuration. Then, procedures comprising, as one cycle, of heating in an heating atmosphere at a temperature of 150° C. for 24 hours continuously, allowing to cool in atmosphere, and then, applying brine spray test according to JIS Z 2371 for 140 hours were repeatedly conducted and the number of cycles till the occurrence of red rust was measured to determine the heat resistance and corrosion resistance.
(5) Impact Shock Resistance and Corrosion Resistance Test
A test specimen applied with 180° bending fabrication at 25 R for one end into a sticky-like configuration, was subjected to procedures comprising, as one cycle, of spraying and blowing pebbles of 9–15 mm particles diameter at air pressure of 5 kg and then applying brine spray test according to JIS Z 2371 for 140 hours repeatedly. Then, the number of cycles till the occurrence of red rust was measured to determine impact shock resistance and corrosion resistance. The results for (4) and (5) are shown in Table 1.

Example 2

(1) Steel Pipe b
Electro-welded pipe made of STPG 38, with 8 mm outer diameter, 0.7 mm wall thickness and 330 mm length.

(2) Zn—Ni alloy plating Layer and the resin layer were formed in the same procedures as those in Example 1 and various tests were applied in the same manner as in Example 1. The results are shown in Table 1.

Example 3

Formation of Zn—Ni alloy plating layer and chromate treatment.

After forming a Zn—Ni alloy plating layer by using a steel pipe a in the same manner as in Example 1, a chromate layer was formed by dipping in a chromate processing solution (Zn-80YMU, manufactured by Ebara-Udylite Co., Ltd.) at a solution temperature of 50° C. for 20 sec.

(2) Subsequently the resin film was formed in the same procedures as in Example 1 and various tests were conducted in the same manner as in Example 1. The results are shown in Table 1.

Example 4

A multi-layer coated steel pipe comprising Zn—Ni alloy plating layer—chromate layer—epoxy resin intermediate layer—polyvinyl fluoride layer was manufactured in the same manner as in Example 3 except for using the steel pipe b and various tests were conducted in the same manner as in Example 1. The results are shown in Table 1.

Example 5

(1) Formation of Metal Plating Layer

A Ni-plating layer was formed to a thickness of 5 um using a steel pipe b in a Watt bath at a current density of 3 $A/dm^2$ and solution temperature of 55° C. Then, a Zn—Ni alloy plating layer of 5 um thickness was formed on the Ni-plating resin by using a Zn—Ni alloy plating bath comprising chloride bath (for example, Zn-10MU, manufactured by Ebara-Udylite Co., Ltd.), to form the Ni-plating layer and the Zn—Ni alloy plating layer on the steel pipe b.

(2) Formation of the Resin Layer and Heat resistance and Corrosion Resistance Test The test was conducted in the same manner as in Example 1.

(3) Impact Shock Resistance and Corrosion Resistance Test

Procedures comprising, as one cycle, of spraying and blowing 850 g of pebbles with 9–15 mm particle diameter to the specimen at an air pressure of 5 kg and, thereafter applying brine spraying test for 140 hours according to JIS Z 2371 were conducted repeatedly (one week). The number of cycles till the occurrence of red rust was measured to determine the impact shock resistance and corrosion resistance.

The results are shown in Table 1.

Example 6

A metal plating layer was formed in the same manner as in Example 5 on the steel pipe a, over which a polyvinyl fluoride layer was deposited while intervening an epoxy resin as an intermediate layer to make a multi-layer coated steel pipe comprising the Ni-plating, Zn—Ni plating layer, epoxy resin intermediate layer and polyvinyl fluoride layer, and the same various tests were conducted as those in Example 5. The results are shown in Table 1.

Example 7

After forming the Ni-plating layer and the Zn—Ni alloy plating layer in the same manner as in Example 5 by using the steel pipe b, a chromate layer was formed on the Zn—Ni alloy plating layer in the same manner as in Example 3 and, subsequently, a polyvinyl fluoride layer was deposited using an epoxy resin as the intermediate layer in the same manner as in Example 1 to manufacture a multi-layer coated steel pipe and various tests were conducted in the same manner as in example 5. The results are shown in Table 1.

Example 8

A multi-layer coated steel pipe was prepared in the same manner as in Example 7 using the steel pipe a and various tests were conducted in the same manner as in Example 5. The results are shown in Table 1.

Comparative Example 1

After forming a Zn-plating layer of 25 um layer thickness under the conventional conditions by using a steel pipe a, chromate treating was applied by using a commercially available chromate processing solution for Zn-plating. Various tests were conducted in the same manner as in Example 1 for the resultant product. The results are shown in Table 1.

Comparative Example 2

Product was obtained in the same manner as in Comparative Example 1 except for using the steel pipe b and various tests were conducted in the same manner as in Example 1. The results are shown in Table 1.

Comparative Example 3

A Zn-plating layer was formed in the same manner as in Comparative Example 1 using the steel pipe a and, after forming an olive chromate layer by using a chromic acid solution with pH 2.1–2.6 containing formic acid, it was immersed in a solution comprising polyvinyl fluoride dispersed in diethyl phthalate to coat polyvinyl fluoride, which was then heat-dried at 350° C. for 60 sec to form a polyvinyl fluoride layer of about 15 um thickness to obtain a product. Various tests were conducted in the same manner as in Example 1 for the resultant product. The results are shown in Table 1.

Comparative Example 4

Product was obtained in the same manner as in Comparative Example 3 except for using the steel pipe b and various tests were conducted in the same manner as in Example 1. The results are shown in Table 1.

TABLE 1

| | | Type of Steel pipe | Kind of layer* | Heat and corrosion resistance | | Impact shock and corrosion resistance | |
|---|---|---|---|---|---|---|---|
| | | | | Straight portion | Bent portion | Straight portion | Bent portion |
| Example | 1 | a | (2)-(4)-(6)-(7) | 7 | 5 | 7 | 6 |
| | 2 | b | (4)-(6)-(7) | 7 | 5 | 7 | 6 |
| | 3 | a | (2)-(4)-(5)-(6)-(7) | 8 | 6 | 10 | 7 |
| | 4 | b | (4)-(5)-(6)-(7) | 8 | 7 | 9 | 7 |
| | 5 | b | (3)-(4)-(6)-(7) | 9 | 7 | 8 | 5 |
| | 6 | a | (2)-(3)-(4)-(6)-(7) | 9 | 7 | 9 | 6 |
| | 7 | b | (3)-(4)-(5)-(6)-(7) | 10 | 7 | 12 | 8 |
| | 8 | a | (2)-(3)-(4)-(5)-(6)-(7) | 11 | 8 | 11 | 8 |
| Comparative Example | 1 | a | Zn-(5) | 2 | 2 | 3 | 2 |
| | 2 | b | Zn-(5) | 2 | 2 | 3 | 2 |
| | 3 | a | Zn-(5')-(7) | 4 | 3 | 8 | 7 |
| | 4 | b | Zn-(5')-(7) | 4 | 3 | 8 | 6 |

Note
*(2) - Cu-plating layer, (3) - Ni-plating layer
(4) - Zn-Ni alloy plating layer
(5) - Chromate layer, (5') - Olive chromate layer
(6) - Epoxy resin intermediate layer
(7) - Polyvinyl fluoride layer In the present invention, since a fluoro resin layer is formed by way of a resin intermediate layer on a Zn—Ni alloy plating layer or on a metal plating layer comprising Ni-plating layer and the Zn—Ni alloy plating layer, excellent effects can be obtained, for example, having excellent heat resistance, having corrosion resistance equal to or higher than that of the conventional Zn-plating even if the entire layer thickness is reduced, capable of forming a resin layer with a good adherence capable of reducing the production cost and extremely useful as pipeway used under severe corrosive circumstance including mechanical external force, etc irrespective of the absence or presence of chromate treatment.

What is claimed is:

1. A heat corrosion resistant steel pipe having a multi-layered coating comprising a steel pipe, a Zn—Ni alloy plating layer deposited on the outer surface of said steel pipe and a polyvinyl fluoride layer formed on said Zn—Ni alloy plating layer with an epoxy resin there between as an intermediate layer,
   wherein a Ni-plating layer of from 0.2 to 10 um thickness is further disposed between the outer surface of the steel pipe and the Zn—Ni alloy plating layer, and
   wherein the Ni content in the Zn—Ni alloy plating layer is from 2 to 20%.

2. A steel pipe as defined in claim 1, wherein a chromate layer is further formed on the Zn—Ni alloy plating layer.

3. A steel pipe as defined in claim 1, wherein a Cu-plating layer is further formed on the outer surface of the steel pipe.

4. A steel pipe as defined in claim 1, wherein the thickness of the epoxy resin is from 3 to 10 um.

5. A steel pipe as defined in claim 1, wherein the polyvinyl fluoride layer has a thickness of from 10 to 25 um.

6. A heat resistant and corrosion resistant steel pipe having a multi-layered coating comprising a steel pipe, a Ni plating layer of 0.2 to 10 um thickness formed on the outer surface of said steel pipe, a Zn—Ni alloy plating layer deposited on said Ni plating layer and a polyvinyl fluoride layer formed on said Zn—Ni alloy plating layer deposited on said Ni plating layer and a polyvinyl fluoride layer formed on said Zn—Ni alloy plating layer with an epoxy resin intermediate layer.

7. A steel pipe as defined in claim 6, wherein a chromate layer is further formed on the Zn—Ni alloy plating layer.

8. A steel pipe as defined in claim 6, wherein a Cu-plating layer is further formed on the outer surface of the steel pipe.

9. A steel pipe as defined in claim 6, wherein the Ni content in the Zn—Ni alloy plating layer is from 2 to 20%.

10. A steel pipe as defined in claim 6, wherein the thickness of the epoxy is from 3 to 10 um.

11. A steel pipe as defined in claim 6, wherein the polyvinyl fluoride layer has a thickness of from 10 to 25 um.

12. A heat and corrosion resistant steel pipe having multi-layered coating comprising a steel pipe, a Ni-plating layer of 0.2 to 10 um thickness formed on the outer surface of said steel pipe, a Zn—Ni plating layer deposited on said Ni-plating layer, a chromate layer formed on said Zn—Ni alloy plating layer and a polyvinyl fluoride layer formed on said chromate layer with an epoxy resin being formed as an intermediate layer.

* * * * *